No. 844,075. PATENTED FEB. 12, 1907.
H. ZIMMERMAN.
CUTTING BOARD.
APPLICATION FILED JUNE 25, 1906.

Witnesses

Inventor
Harry Zimmerman
by
Attorneys

UNITED STATES PATENT OFFICE.

HARRY ZIMMERMAN, OF FREMONT, OHIO.

CUTTING-BOARD.

No. 844,075.  Specification of Letters Patent.  Patented Feb. 12, 1907.

Application filed June 25, 1906. Serial No. 323,299.

*To all whom it may concern:*

Be it known that I, HARRY ZIMMERMAN, a citizen of the United States, and resident of Fremont, Sandusky county, State of Ohio, have invented certain new and useful Improvements in Cutting-Boards, of which the following is a specification.

Cutting-boards as ordinarily constructed for use in machines provided with cutters for cutting large masses of fabric placed upon the board generally consist of blocks with their end grain at the face of the board connected permanently together. In many uses such boards will be so cut by the dies or cutters as to necessitate refacing in the course of a few hours, the said facing consisting in planing off the cutting-board until the damaged portions are removed. This planing operation is expensive, costing from two to five or six dollars at each operation, and to avoid this expense, as well as reduce the cost of making the cutting-boards, I construct the same as fully set forth hereinafter and as illustrated in the accompanying drawings, in which—

Figure 1:
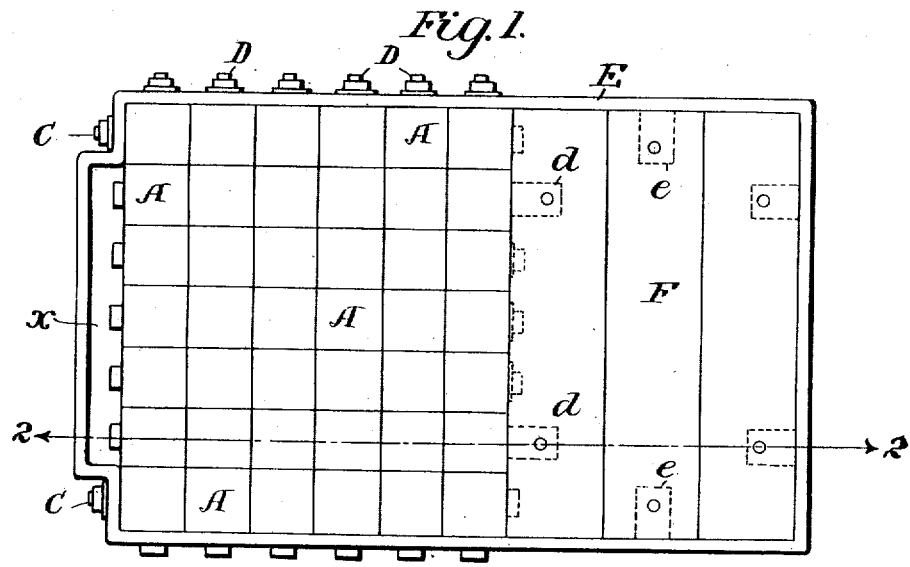
Figure 2:
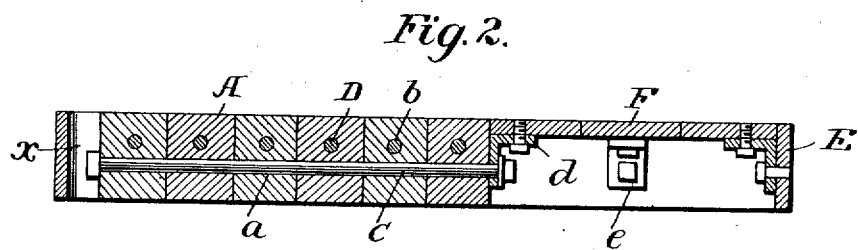
Figure 3:
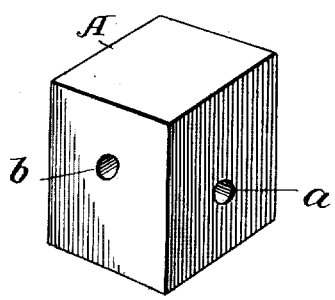
Figure 4:
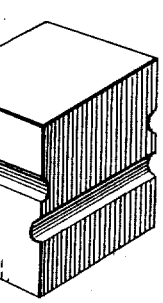

Figure 1 is a plan view of a cutting-board constructed in accordance with my improvement; Fig. 2, a section on the line 2 2, Fig. 1; Fig. 3, a perspective view of one of the blocks detached; Fig. 4, a perspective view illustrating a different way of recessing the blocks.

The board consists of a series of rectangular blocks A of any suitable proportions, but cut so that the end grain will be presented to the face, and each block has one or more channels $a$ extending in one direction and one or more channels $b$ extending in a direction at right angles to the channel $a$.

The blocks are arranged in contact in rows with the channels $a$ in line with each other, and successive rows are arranged so that the channels $b$ will be in line, and through each series of channels $a$ there is passed a tie rod or bolt C, and through each series of channels $b$ is passed a similar tie rod or bolt D. These bolts or rods are provided with heads and nuts and washers at the ends when no frame is used, so that each row of blocks is tied together in line by one of the rods in one direction and is tied to the adjacent row by the various rods passing in the direction at right angles to the first. By this means the blocks are tied securely and effectively but separately together, so that by withdrawing the rods the blocks may be handled individually, and instead of being planed down to a new surface after being cut by the cutters the injured surfaces may be removed by sawing the blocks transversely with a reciprocating or circular saw, an operation which may be performed upon the entire series of blocks of a cutting-board in a few minutes, when they are replaced and connected together as before. By this means I avoid all of the expenses incident to the ordinary modes of constructing the boards and dressing the same.

Instead of connecting the blocks by bolts provided at the ends with washers bearing on the blocks themselves I may arrange the blocks within a frame E of proper construction, the bolts passing through openings in the frame, and in order to properly handle the board the latter may be provided with a handhold. One method of forming the latter is shown in Fig. 1 and consists in bending out or cutting away one of the side pieces of the frame at $x$.

In many cases it is desirable to have a support for the material at one side of the cutting-board, and to provide such a support I extend the frame E beyond the mass of blocks at one side and support a platform F by the extension. As shown, the said platform is supported at one side by angle-bars $d$, bolted to the ends of the rods C, and at the other side of the frame by angle-bars $e$, bolted to the sides of the frames.

The channels $a\ b$ may extend through the body of each block at right angles, as shown in Fig. 3, or they may be formed in the sides of the blocks, as shown in Fig. 4.

Without limiting myself to the precise construction shown, I claim as my invention—

1. The combination in a cutting-board, of a series of separable blocks arranged in rows and in contact with each other, each having recesses at right angles to each other, and tie-rods extending at right angles to each other through said recesses.

2. The combination in a cutting-board, of a series of separable blocks arranged in contact, each having recesses at right angles to each other, a frame inclosing said blocks, and tie-rods extending at right angles to each other through the said recesses and connected to the frame.

3. The combination in a cutting-board, a series of blocks arranged in contact, means for connecting the blocks together, a frame inclosing and extending at one side beyond the blocks, and a platform supported by the extended portion of the frame.

In testimony whereof I affix my signature in presence of two witnesses.

HARRY ZIMMERMAN.

Witnesses:
CHARLES E. FOSTER,
EDWIN S. CLARKSON.